United States Patent
Buffet et al.

(10) Patent No.: US 6,523,150 B1
(45) Date of Patent: Feb. 18, 2003

(54) METHOD OF DESIGNING A VOLTAGE PARTITIONED WIREBOND PACKAGE

(75) Inventors: Patrick H. Buffet, Essex Junction, VT (US); Charles S. Chiu, Essex Junction, VT (US); Yu H. Sun, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/682,621

(22) Filed: Sep. 28, 2001

(51) Int. Cl.[7] .............................................. G06F 17/50
(52) U.S. Cl. ......................................................... 716/4
(58) Field of Search .............................. 713/500; 716/1, 716/4, 7, 12, 13; 710/261

(56) References Cited

U.S. PATENT DOCUMENTS

| | | | |
|---|---|---|---|
| 4,914,503 A | 4/1990 | Shirato et al. ............... | 257/691 |
| 5,081,561 A | 1/1992 | Smith ........................... | 361/760 |
| 5,987,244 A | * 11/1999 | Kau et al. .................... | 713/500 |
| 6,057,169 A | 5/2000 | Singh et al. .................. | 438/14 |
| 6,159,841 A | 12/2000 | Williams et al. ............. | 438/619 |
| 6,201,701 B1 | 3/2001 | Linden et al. ............... | 361/720 |
| 6,421,754 B1 | * 7/2002 | Kau et al. .................... | 710/261 |

* cited by examiner

Primary Examiner—Matthew Smith
Assistant Examiner—Thuan Do
(74) Attorney, Agent, or Firm—Schmeiser Olsen & Watts; Richard M. Kotulak (57) ABSTRACT

Disclosed is a method of designing voltage partitions in a package for a chip, comprising: determining the current requirements of a chip voltage island comprising a voltage island and power and signal chip pads; computing the voltage drop across power buses in the chip voltage island; assigning additional chip pads to the chip voltage island for use as power pads if the voltage drop is not acceptable; defining a package voltage island, the package voltage island including power and signal package pads; analyzing electrical attributes of a combination of the chip voltage island, the package voltage island and conductive interconnects connecting chip voltage island pads to package voltage island pads; and assigning additional chip pads to the chip voltage island and additional package pads to the package voltage island for use as power pads until the electrical attributes are acceptable.

27 Claims, 10 Drawing Sheets

| CHIP PADS | PACKAGE PADS | FUNCTION |
|---|---|---|
| P1 | A1 | GND |
| P2 | A2 | VDD |
| P3 | A3 | VDDX |
| P4 | B1 | SIGNAL 1 |
| P5 | B2 | GND |
| P6 | B3 | VDD |
| P7 | C1 | VDDX |
| P8 | C2 | SIGNAL 2 |
| P9 | C3 | GND |
| ⋮ | ⋮ | ⋮ |

METHOD OF DESIGNING A VOLTAGE PARTITIONED WIREBOND PACKAGE

FIELD OF THE INVENTION

The present invention relates to the field of integrated circuit design; more specifically, it relates to a method for designing a voltage partitioned wirebond package.

BACKGROUND OF THE INVENTION

In an effort to increase performance, lower power consumption and integrate several integrated circuit technologies on the same chip, the concept of voltage islands has been introduced into integrated circuit design.

The voltage island concept allows for one or more portions of an integrated chip (islands) to be powered by both a chip wide power source ($V_{DD}$) and one or more additional, voltage island power sources ($V_{DDX}$.) $V_{DDX}$ and $V_{DD}$ can be switched on and off by the user as the operation of the integrated circuit demands. However, integrated circuit chips are generally mounted to a next higher level of packaging. One widely used class of packages is wirebond packages.

A wirebond package for an integrated circuit chip having a voltage island (a voltage partitioned wirebond package) must be compatible with and capable of supporting the power distribution and noise requirements of the voltage island, while not violating the geometric constraints of the wirebond package technology. Such restraints include wirebond lengths and crossovers and limited pad counts in the proximity the voltage island. Additionally, wire runs from the voltage island to chip pads must not exceed predetermined limits.

Present design methodology for voltage partitioned wirebond packages relies heavily on user intervention and trial and error approaches that are both costly and time consuming. An automated design methodology for voltage partitioned wirebond packages would greatly speed up the wirebond package design process and reduce costs.

SUMMARY OF THE INVENTION

A first aspect of the present invention is a method of designing voltage partitions in a package for a chip, comprising: determining the current requirements of a chip voltage island comprising a voltage island and power and signal chip pads; computing the voltage drop across power buses in the chip voltage island; assigning additional chip pads to the chip voltage island for use as power pads if the voltage drop is not acceptable; defining a package voltage island, the package voltage island including power and signal package pads; analyzing electrical attributes of a combination of the chip voltage island, the package voltage island and conductive interconnects connecting chip voltage island pads to package voltage island pads; and assigning additional chip pads to the chip voltage island and additional package pads to the package voltage island for use as power pads until the electrical attributes are acceptable.

A second aspect of the present invention is a method of designing voltage partitions in a package for a chip, comprising: determining the current requirements of a chip voltage island comprising a voltage island and power and signal chip pads; creating a chip voltage island model; computing the voltage drop across power buses in the chip voltage island; assigning more chip power pads to the chip voltage island if the voltage drop is not acceptable; defining a package voltage island, the package voltage island including power and signal package pads; adding conductive interconnects to the chip voltage island model to create a chip voltage island/package interconnect model; creating a package voltage island inductance model; analyzing electrical attributes of the combination of chip voltage island/package interconnect model and package voltage island inductance model; and assigning additional chip pads to the chip voltage island pads and additional package pads to the package voltage island for use as power pads until the electrical attributes are acceptable.

A third aspect of the present invention is a computer system comprising a processor, an address/data bus coupled to said processor, and a computer-readable memory unit coupled to communicate with said processor, said memory unit containing instructions that when executed implement a method for designing voltage partitions in a package for a chip, said method comprising the computer implemented steps of: determining the current requirements of a chip voltage island comprising a voltage island and power and signal chip pads; computing the voltage drop across power buses in the chip voltage island; assigning additional chip pads to the chip voltage island for use as power pads if the voltage drop is not acceptable; defining a package voltage island, the package voltage island including power and signal package pads; analyzing electrical attributes of a combination of the chip voltage island, the package voltage island and conductive interconnects connecting chip voltage island pads to package voltage island pads; and assigning additional chip pads to the chip voltage island and additional package pads to the package voltage island for use as power pads until the electrical attributes are acceptable.

A fourth aspect of the present invention is a computer system comprising a processor, an address/data bus coupled to said processor, and a computer-readable memory unit coupled to communicate with said processor, said memory unit containing instructions that when executed implement a method for designing voltage partitions in a package for a chip, said method comprising the computer implemented steps of: determining the current requirements of a chip voltage island comprising a voltage island and power and signal chip pads; creating a chip voltage island model; computing the voltage drop across power buses in the chip voltage island; assigning more chip power pads to the chip voltage island if the voltage drop is not acceptable; defining a package voltage island, the package voltage island including power and signal package pads; adding conductive interconnects to the chip voltage island model to create a chip voltage island/package interconnect model; creating a package voltage island inductance model; analyzing electrical attributes of the combination of chip voltage island/package interconnect model and package voltage island inductance model; and assigning additional chip pads to the chip voltage island pads and additional package pads to the package voltage island for use as power pads until the electrical attributes are acceptable.

A fifth aspect of the present invention is a program storage device readable by machine, tangibly embodying a program of instructions executable by the machine to perform method steps for designing voltage partitions in a package for a chip said method steps comprising: determining the current requirements of a chip voltage island comprising a voltage island and power and signal chip pads; computing the voltage drop across power buses in the chip voltage island; assigning additional chip pads to the chip voltage island for use as power pads if the voltage drop is not acceptable; defining a package voltage island, the package voltage island including power and signal package pads; analyzing electrical attributes of a combination of the chip voltage island, the package voltage island and conductive interconnects connecting chip voltage island pads to package voltage island pads; and assigning additional chip pads to the chip voltage island and additional package pads to the package voltage island for use as power pads until the electrical attributes are acceptable.

A sixth aspect of the present invention is a program storage device readable by machine, tangibly embodying a program of instructions executable by the machine to perform method steps for designing voltage partitions in a package for a chip said method steps comprising: determining the current requirements of a chip voltage island comprising a voltage island and power and signal chip pads; creating a chip voltage island model; computing the voltage drop across power buses in the chip voltage island; assigning more chip power pads to the chip voltage island if the voltage drop is not acceptable; defining a package voltage island, the package voltage island including power and signal package pads; adding conductive interconnects to the chip voltage island model to create a chip voltage island/package interconnect model; creating a package voltage island inductance model; analyzing electrical attributes of the combination of chip voltage island/package interconnect model and package voltage island inductance model; and assigning additional chip pads to the chip voltage island pads and additional package pads to the package voltage island for use as power pads until the electrical attributes are acceptable.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
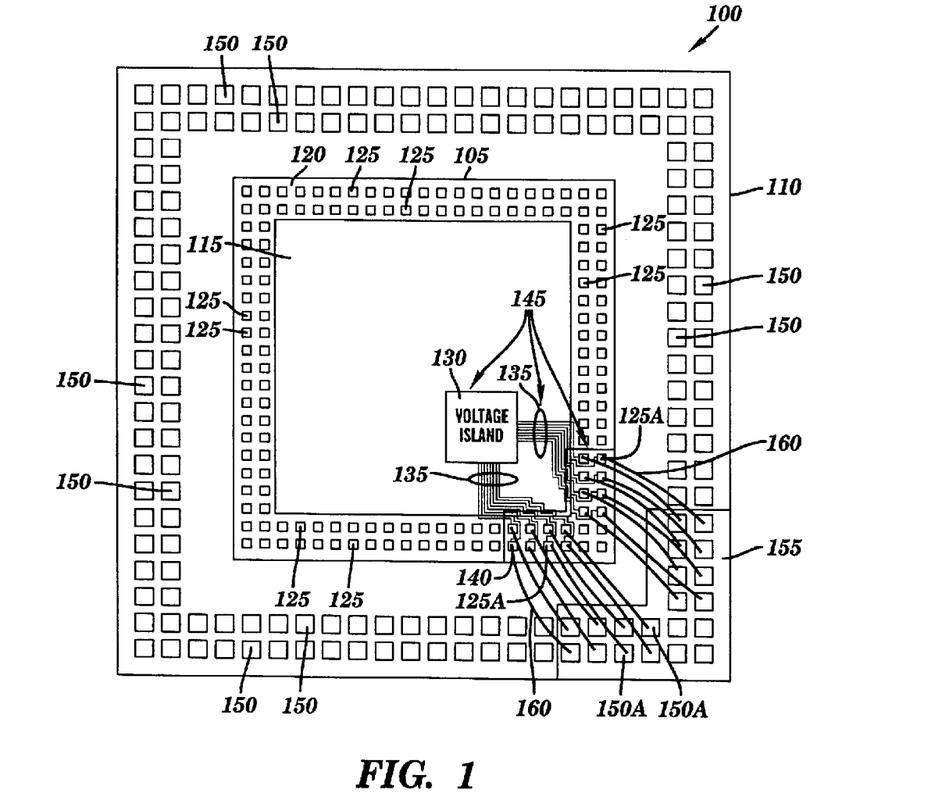
FIG. 1 is a top view of a voltage partitioned wirebond package according to the present invention.

FIG. 1 is a top view of a voltage partitioned wirebond package according to the present invention. Integrated circuit device 100 includes an integrated circuit chip 105 mounted on a wirebond package 110. Integrated circuit chip 105 has a centrally located active region 115, surrounded by a chip pad region 120. Chip pad region 120 contains a multiplicity of chip pads 125 arranged around the periphery of integrated circuit chip 105. Within active region 115 is a voltage island 130. Voltage island 130 is powered by both $V_{DD}$ and one or more additional power sources $V_{DDX}$. Voltage island 130 is connected to a multiplicity of chip voltage island pads 125A. Chip voltage island pads 125A are a subset of chip pads 125 that are physically located in a voltage island pad region 140 of chip pad region 120. Voltage island 130 is electrically connected to chip voltage island pads 125A by wires 135. Wires 135 carry $V_{DD}$, $V_{DDX}$, GND and I/O signals between voltage island 130 and chip voltage island pads 125A. A chip voltage island 145 comprises voltage island 130, wires 135, chip voltage island pad region 140 and chip voltage island pads 125A.

Wirebond package 110 includes a multiplicity of package pads 150 arranged around the periphery of the wirebond package. A multiplicity of package voltage island pads 150A are physically located in a package voltage island 155. Package voltage island pads 150A are a subset of package pads 150. Chip voltage island pads 125A are electrically connected to package voltage island pads 150A by wirebond wires 160. Wirebond wires 160 between chip pads 125 and package pads 150 are not illustrated to avoid cluttering FIG. 1 but it should be understood that all active chip pads are electrically connected to package pads by wirebond wires.

Figure 2:
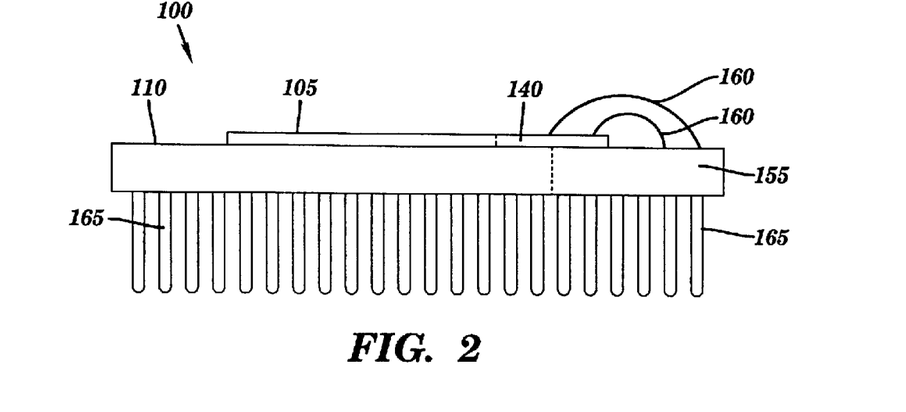
FIG. 2 is a side view of the voltage partitioned wirebond package illustrated in FIG. 1, according to the present invention.

FIG. 2 is a side view of the voltage partitioned wirebond package illustrated in FIG. 1, according to the present invention. In FIG. 2, wirebond package 110 includes a multiplicity of pins 165 arranged on a opposite side of the package from integrated circuit chip 105. Thus, the wirebond package illustrated in FIG. 2 is a pin grid array (PGA) package. The present invention may be applied to other package types. Examples of other package types include, but are not limited to, ball grid array (BGA) packages and quad flat pac (QFP) packages.

Figure 3:
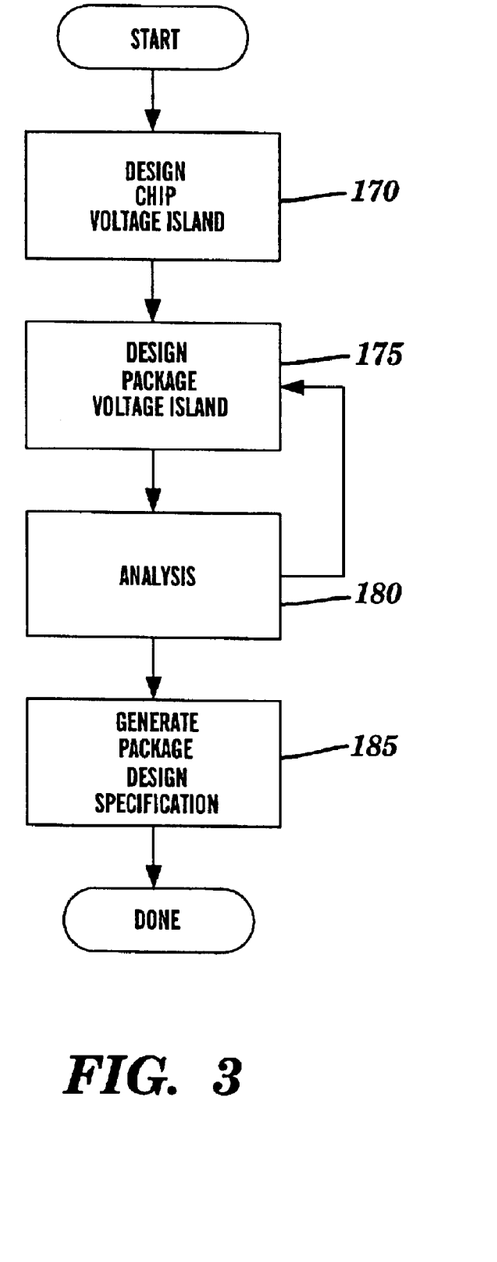
FIG. 3 is a flow diagram describing the method of designing a voltage partitioned wirebond package according to the present invention.
Figure 4:
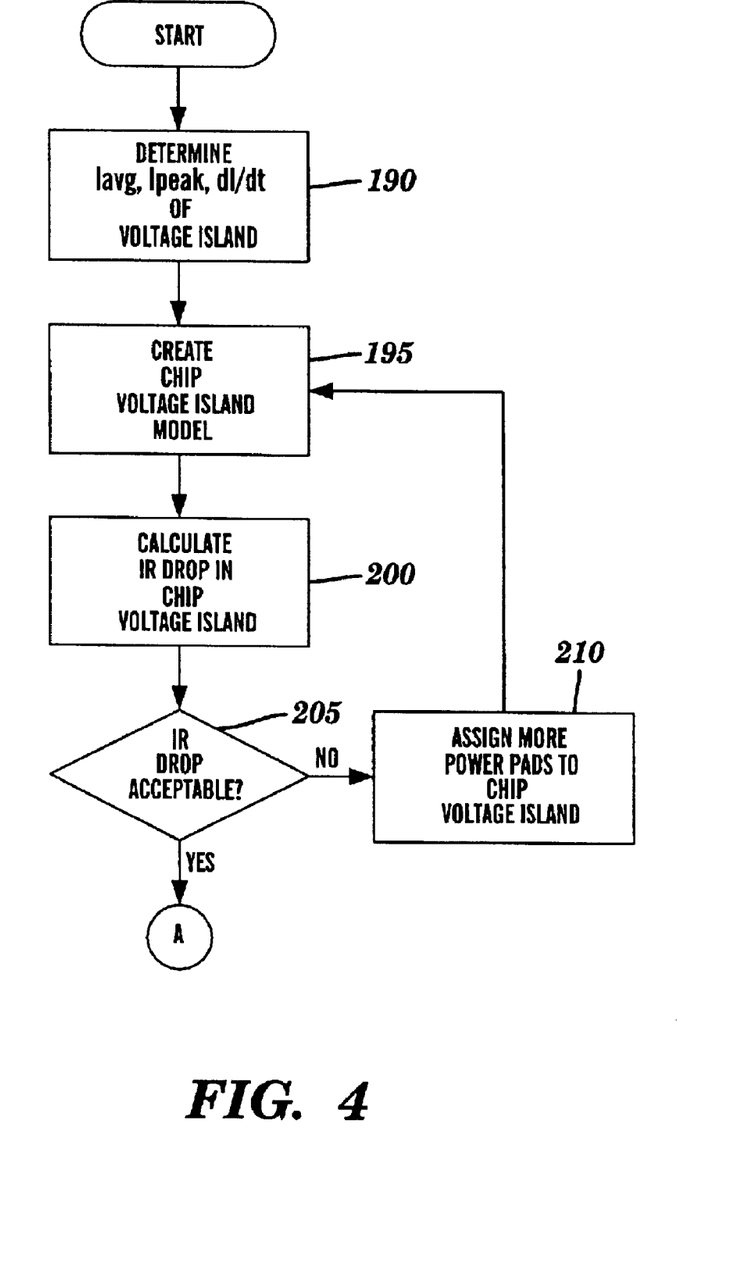
FIG. 4 is a flow diagram describing in detail step 170 of the flowchart illustrated in FIG. 3, according to the present invention.

FIG. 3 is a flow diagram describing the method of designing a voltage partitioned wirebond package according to the present invention. In step 170, chip voltage island 145 is designed. The method of designing chip voltage island 145 includes determining the current related parameters of voltage island 130, assigning chip voltage island pads 125A to the chip voltage island, creating a model of the chip voltage island, determining voltage drops within the chip voltage island, and assigning additional chip voltage island pads until the voltage drop is within acceptable limits. Step 170 is illustrated in FIG. 4, and described in more detail below.

Figure 8:
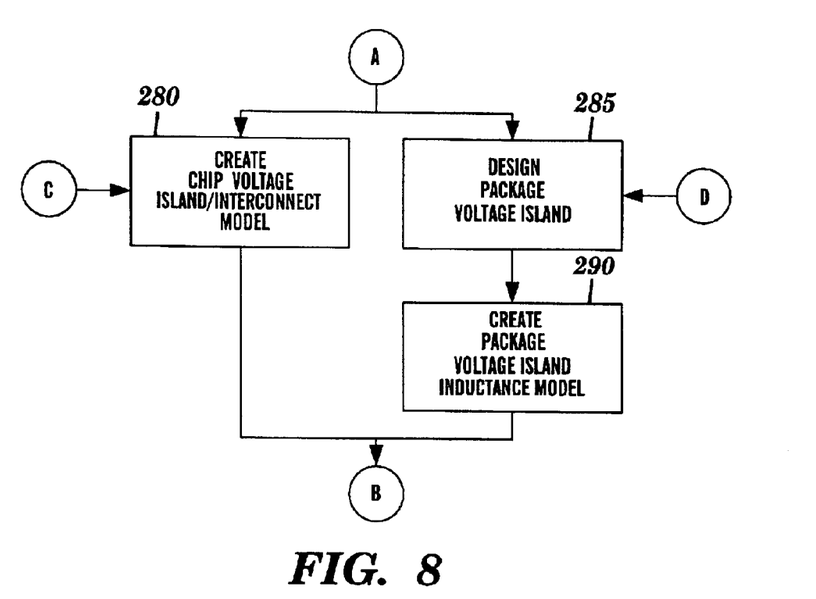
FIG. 8 is a flow diagram describing in detail step 175 of the flowchart illustrated in FIG. 3, according to the present invention.

In step 175, package voltage island 155 is designed. The method of designing package voltage island 155 includes adding wirebond wires 160 to the chip voltage island model 145 to create a chip voltage island/package interconnect model, assigning package voltage island pads 150A to create the package voltage island and creating a package voltage island inductance model. Step 175 is illustrated in FIG. 8, and described in more detail below.

Figure 11:
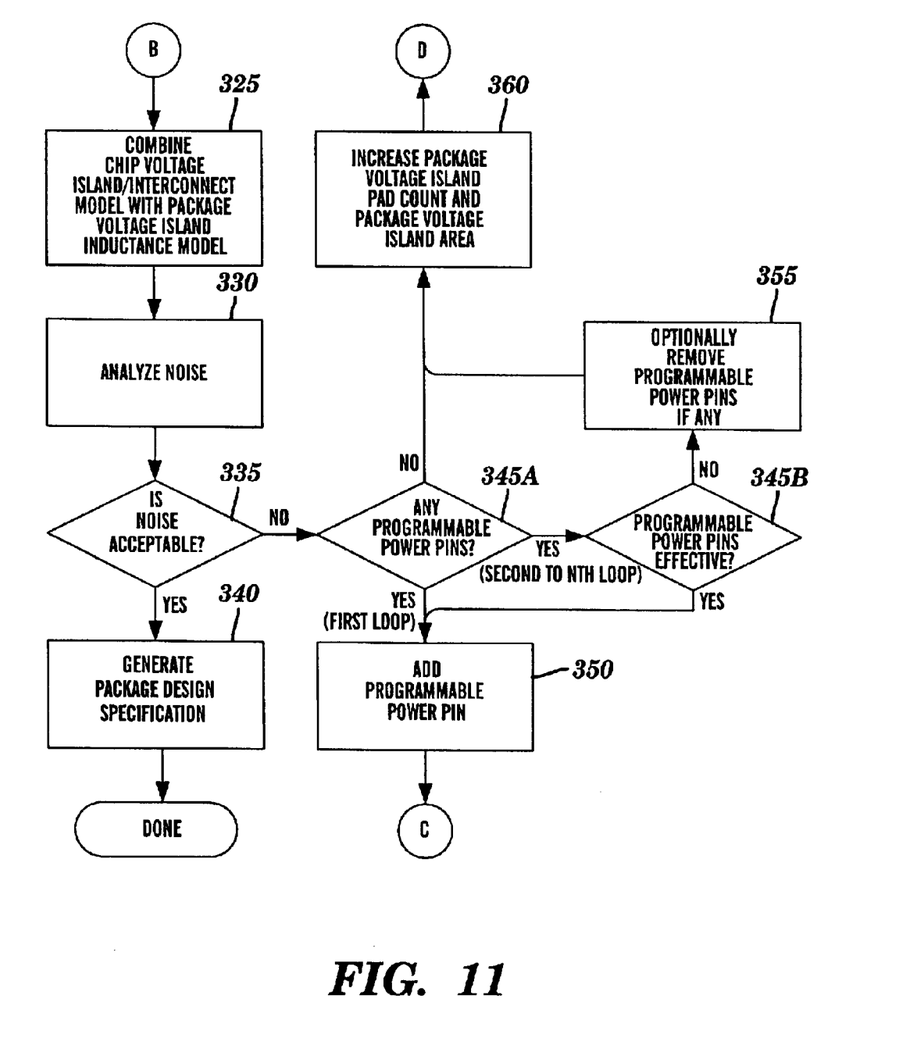
FIG. 11 is a flow diagram describing in detail step 180 of the flowchart illustrated in FIG. 3, according to the present invention.

In step 180, the chip voltage island/package interconnect model is combined with the package voltage island inductance model, a noise analysis (analysis of other electrical attributes such as power supply impedance analysis, power supply resonance analysis, signal integrity analysis and signal jitter analysis may also be done) is performed and additional chip pads 125A and/or package pads 150 assigned to package voltage island 155 (and corresponding chip pads 125 assigned to voltage island pad region 140). Step 180 is illustrated in FIG. 11, and described in more detail below.

Figure 15:
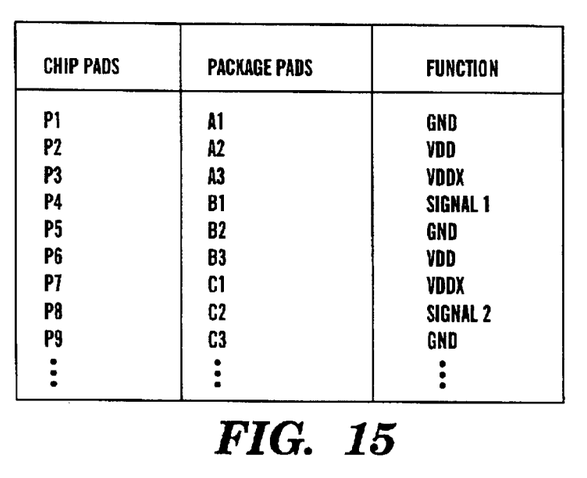
FIG. 15 is a table illustrating a package design specification according to the present invention.

In step 185, a voltage partitioned package design specification is generated. An example of a voltage partitioned package design specification is illustrated in FIG. 15 and described below.

FIG. 4 is a flow diagram describing in detail step 170 of the flowchart illustrated in FIG. 3, according to the present invention. In step 190, it is assumed that a preliminary design for voltage island 130 has been defined (including a preliminary set of chip voltage island pads 125A, pad assignments for $V_{DD}$, $V_{DDX}$, GND and I/O signals, and wires 135) based on circuit requirements. Based on the circuit requirements for voltage island 130 the average current (Iavg), the peak current (Ipeak) and current slew rate (dI/dt) can be determined from either the specification of the voltage island or from a circuit model of the voltage island. A typical plot of current vs. time for a voltage island is illustrated in FIG. 5 and described below.

Next, in step 195, a chip voltage island model is created. The chip voltage island model includes voltage island chip pads 125A. The current requirements determined in step 190 are used as input data to the chip voltage island model. A diagram of a chip voltage island model is illustrated in FIG. 6 and described below.

Figure 7:
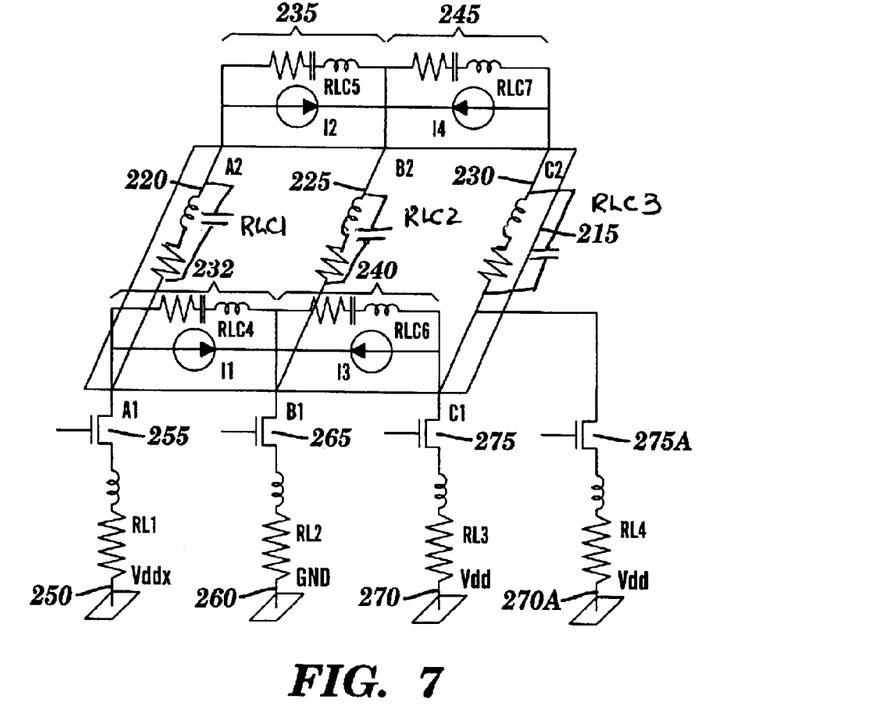
FIG. 7 is a diagram of an equivalent circuit model of a chip voltage island after assigning additional power pads to the chip voltage island according to the present invention.

In one example, the chip voltage island model is created from design specifications and inputted to a SPICE (simulation program for integrated circuits emphasis) based software package. SPICE is a circuit simulator that was originally developed at the Electronics Research Laboratory of the University of California, Berkeley (1975) and many well-known commercial software packages are available. In a SPICE simulator, the user inputs circuit topology in a spice netlist format. The simulator may calculate and plot nodal voltages and currents in both time and frequency domains Next in step 200, the voltage drop in chip voltage island 145 is computed across $V_{DD}$, $V_{DDX}$ and GND (based upon the peak or average current and the number of chip voltage island pads 125A devoted to power distribution) using the chip voltage island model created in step 195. In step 205, it is determined if the voltage drop computed in step 200 is acceptable by comparison to an voltage drop limit determined by the chip designer. If the voltage drop is acceptable, the method proceeds to steps 280 and 285 in FIG. 8. If the voltage drop is not acceptable, additional chip pads 125 are assigned as voltage island chip pads 125A, specifically as power pads assigned to either $V_{DD}$, $V_{DDX}$ or GND depending upon which power bus failed and the method loops back to step 195. Assignment of additional power pads many require changes to wires 135 as well. The assignment of additional power pads is illustrated in FIG. 7 and described below.

Figure 5:
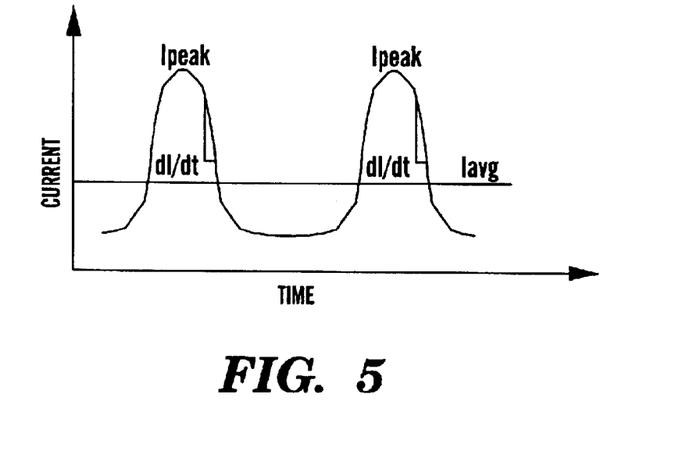
FIG. 5 is a plot of current vs. time illustrating current flow in a voltage island according to the present invention.

FIG. 5 is a plot of current vs. time illustrating current flow in a voltage island according to the present invention. In FIG. 5, $I_{PEAK}$ is the maximum current voltage island 130 draws. Generally, voltage island 130 is drawing $I_{PEAK}$ for only a short time, but the power buses must be able to supply $I_{PEAK}$ without exceeding voltage drop limits. $I_{AVG}$ is the time averaged current voltage island 130 is drawing. dI/dt is the rate of rise or fall of current in voltage island 130. The power buses must be able to supply quick rises and falls in current without exceeding voltage drop limits.

Figure 6:
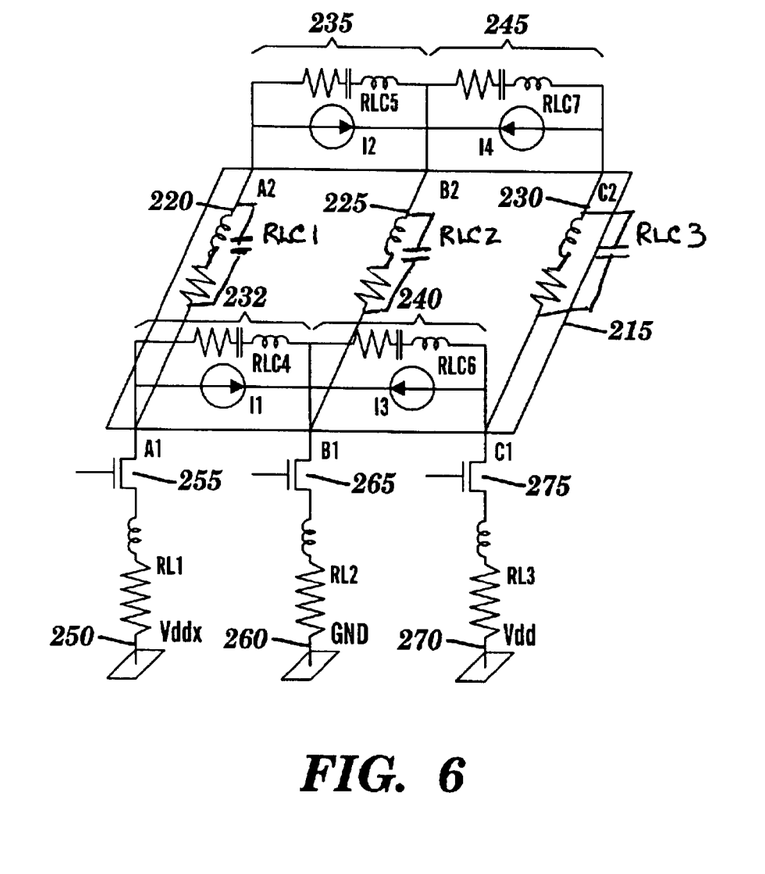
FIG. 6 is a diagram of an equivalent circuit model of a chip voltage island according to the present invention.

FIG. 6 is a diagram of an equivalent circuit model of a chip voltage island according to the present invention. In FIG. 6, a chip power bus 215 is modeled as a $V_{DDX}$ bus 220 between nodes "A1" and "A2" having a resistance, capacitance and inductance $RLC_1$, a GND bus 225 between nodes "B1" and "B2" having a a resistance, capacitance and inductance $RLC_2$ and a $V_{DD}$ bus 230 between nodes "C1" and "C2" having a resistance, capacitance and inductance $RLC_3$. For a simple model, at low frequency, only resistance and capacitance need be modeled. At frequencies approaching 1 GHz, resistance, capacitance and inductance should be modeled for accuracy. At 10 GHz and higher resistance, capacitance and inductance almost certainly should be modeled.

The load on power plane 215 is modeled as a first load 230 across nodes "A1" and "B1," a second load 235 across nodes "A2" and "B2," a third load 240 across nodes "C1" and "B1" and a fourth load 245 across nodes "C2" and "B2." First load 230 is modeled as a current source $I_1$ and a resistance, capacitance and inductance $RLC_4$. Second load 235 is modeled as a current source $I_2$ and a resistance, capacitance and inductance $RLC_5$. Third load 240 is modeled as a current source $I_3$ and a resistance, capacitance and inductance $RLC_6$. Fourth load 245 is modeled as a current source $I_4$ and a resistance, capacitance and inductance $RLC_7$. First and second loads 230 and 235 are powered by $V_{DDX}$ while third and fourth loads 240 and 245 are powered by $V_{DD}$. While four loads are illustrated in FIG. 6, generally there is a multiplicity of loads.

$V_{DDX}$ is supplied to $V_{DDX}$ bus 220 from a $V_{DDX}$ chip pad 250 through a $V_{DDX}$ header device 255. GND is supplied to GND bus 225 from a GND chip pad 260 through a GND header device 265. $V_{DD}$ is supplied to $V_{DD}$ bus 230 from a $V_{DD}$ chip pad 270 through a $V_{DD}$ header device 275. There may be multiple $V_{DDX}$, $V_{DD}$ and GND chip pads. $V_{DDX}$ chip pad 250 is modeled as a resistance and inductance $RL_1$. GND chip pad 260 is modeled as a resistance and inductance $RL_2$. $V_{DD}$ chip pad 270 is modeled as a resistance and inductance $RL_3$.

While only one $V_{DDX}$, $V_{DD}$ and GND chip pads are illustrated in FIG. 6, generally there is a multiplicity of $V_{DD}X$, $V_{DD}$ and GND pads for each voltage island. There may also be a multiplicity of header devices fed from the same pad. FIG. 6 is an example of how the circuits and package may be modeled. The actual model used will depend upon the chip power bus design and types of circuits utilized.

Voltage drops are calculated at nodes A1 and A2, B1 and B2 and C1 and C2.

FIG. 7 is a diagram of an equivalent circuit model of a chip voltage island after assigning additional power pads to the chip voltage island according to the present invention. In FIG. 7, an additional $V_{DD}$ pad 270A (modeled by a resistance, capacitance and inductance $RLC_4$) and header device 275A have been connected to $V_{DD}$ bus 215. This example assumes that the voltage drop on $V_{DD}$ bus 230 was unacceptable in step 205, while the voltage drop on $V_{DDX}$ bus 220 and GND bus 225 was acceptable.

FIG. 8 is a flow diagram describing in detail step 175 of the flowchart illustrated in FIG. 3, according to the present invention. In step 280, wirebond wires are added to the model of chip voltage island 145 to create a chip voltage island/package interconnect model, the wirebond wires being conductive interconnects between chip voltage island pads 125A and package voltage island pads 150A. The chip voltage island/package interconnect model is illustrated in FIG. 9 and described below.

In step 285, package voltage island 155 is designed. Referring to FIG. 1, designing package voltage island 155 includes defining which package pads 150 will be designated as package voltage island pads 150A, and pairing the package voltage island pads with chip voltage island pads. Generally, package voltage island pads 150A are chosen in a manner that minimizes the length of wires 135 and reside in one contiguous region that mimics the geometry of voltage island pad region 140. This allows for a one to one mapping of chip voltage island pads 125A to package voltage island pads 150A. However, it is possible to lay out package voltage island pads in two or more distinct groupings, with non-voltage island pads between regions of package voltage island pads.

Figure 10:
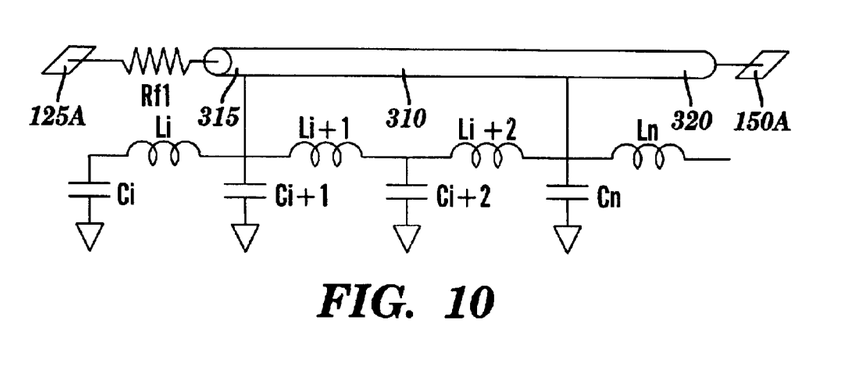
FIG. 10 is an equivalent circuit model diagram of a package voltage island according to the present invention.

In step 290, a package voltage island inductance model is created using an electromagnetic field solver. An electromagnetic field solver is a software tool that reads in the geometry (length and cross-section) of conductor structures, and given the dielectric constant of the medium, generates the electrical equivalent R (resistor), C (capacitor) and L (inductor) circuit representation. An example of an electromagnetic field solver software tool is HFSS by the Ansoft Corporation (Pittsburgh, Pa.) An example of an a package voltage island inductance model is illustrated in FIG. 10 and described below. The method continues with step 325 of FIG. 11.

Figure 9:
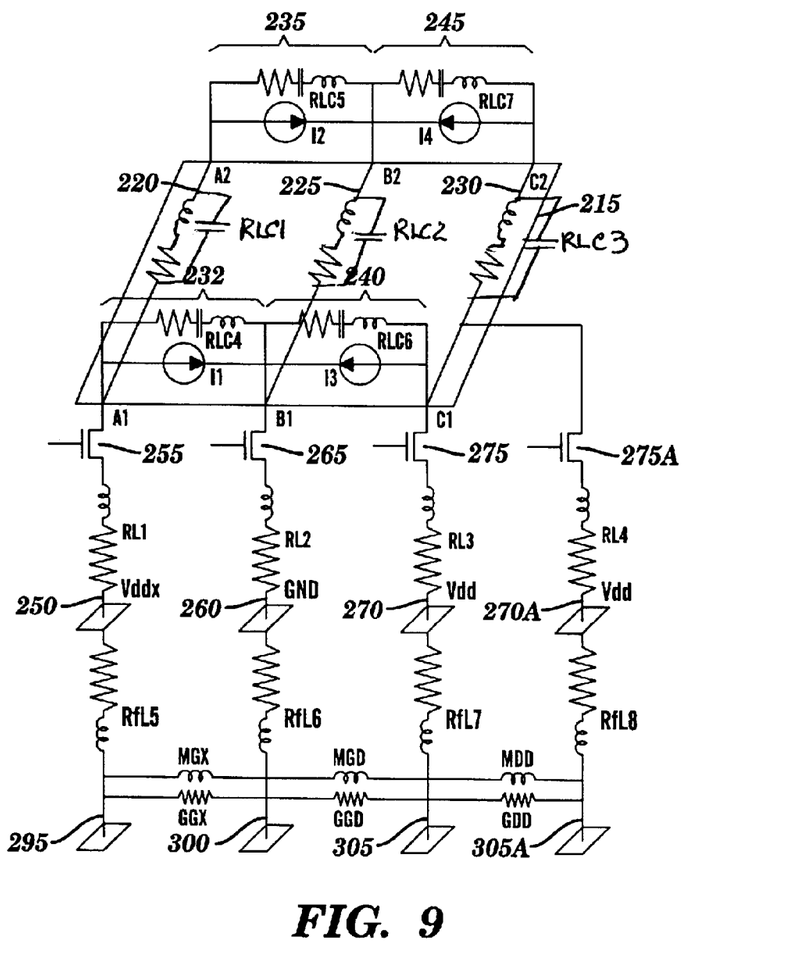
FIG. 9 is a diagram of an equivalent chip voltage island/package interconnect model according to the present invention.

FIG. 9 is a diagram of an equivalent chip voltage island/package interconnect model according to the present invention. In FIG. 9, wirebond wires 295, 300, 305 and 305A (modeled as resistor/inductors $R_fL_5$, $R_fL_6$, $R_fL_7$ and $R_fL_8$ respectively) are added to simulated circuit model chip voltage island 145 illustrated in FIG. 7. $R_f$ indicates that the resistance is frequency dependent. Wirebond wire 295 is coupled to $V_{DDX}$ chip pad 250. Wirebond wire 300 is coupled to GND chip pad 260. Wirebond wire 305 is coupled to $V_{DD}$ chip pad 270. Wirebond wire 305A is coupled to added $V_{DD}$ pad 270A.

Also illustrated in FIG. 9 are inductance MGX and resistance GGX between wirebond wires 295 and 300, inductance MGD and resistance GGD between wirebond wires 300 and 305, and inductance MDD and resistance GDD between wirebond wires 305 and 305A that may be modeled. Other inductances include the combinations of MGX and MGD, MGD and MDD and MGX and MDD. Other resistances that may be modeled include the combinations GGX and GGD, GGD and GDD and GGX and GDD.

FIG. 10 is an equivalent circuit model diagram of a package voltage island according to the present invention. In FIG. 10, a wirebond wire 310 has a first end 315 coupled to a voltage island chip pad 125A and a second end 320 coupled to a package voltage island pad 150A. A frequency dependent resistor $R_{f1}$ is modeled between voltage island chip pad 150A and first end 315. The field solver represents the inductance on wirebond wire 310 as a transmission line referenced on a network of inductors LI through LI+N, each inductor coupled to ground through a capacitor $C_I$ to $C_{I+N}$.

Figure 12:
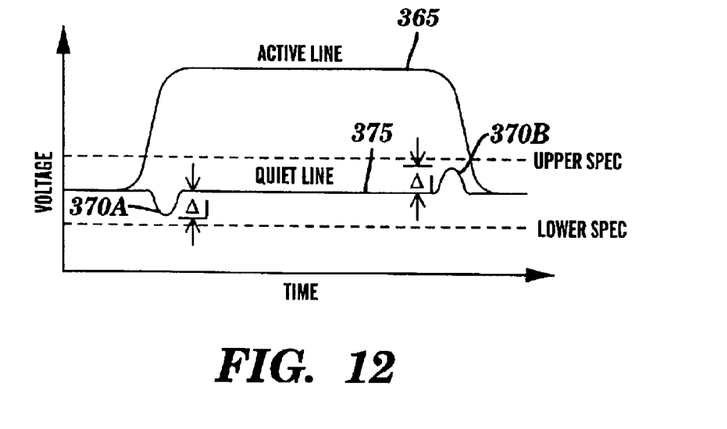
FIG. 12 is a plot of voltage vs. time illustrating noise induced in a quiet wirebond wire by an active wirebond wire according to the present invention.

FIG. 11 is a flow diagram describing in detail step 180 of the flowchart illustrated in FIG. 3, according to the present invention. In step 325, the chip voltage island/package interconnect model is combined with the package voltage island inductance model and inputted to a simulator such as SPICE. In step 330, the combined chip voltage island/package interconnect model is analyzed for noise, again using a simulator such as SPICE. In the present example, the analysis is limited to noise, but other analysis such as power supply impedance analysis, power supply resonance analysis, signal integrity analysis and signal jitter analysis may also be done using similar techniques as used for noise analysis. Noise is a voltage spike (DI) induced in a quiet wirebond wire by an active wirebond wire when the active wire is switching. An example of noise induced in a quiet wirebond wire by an active wirebond is illustrated in FIG. 12 and described below. In step 335, a determination is made if the noise level of the combined chip voltage island/package interconnect mode is acceptable (within specification.)

If in step 335, the noise level is acceptable then the method proceeds to step 340. In step 340, a package design specification is generated and the method terminates. A package design specification is illustrated in FIG. 15 and described below.

Figure 13:
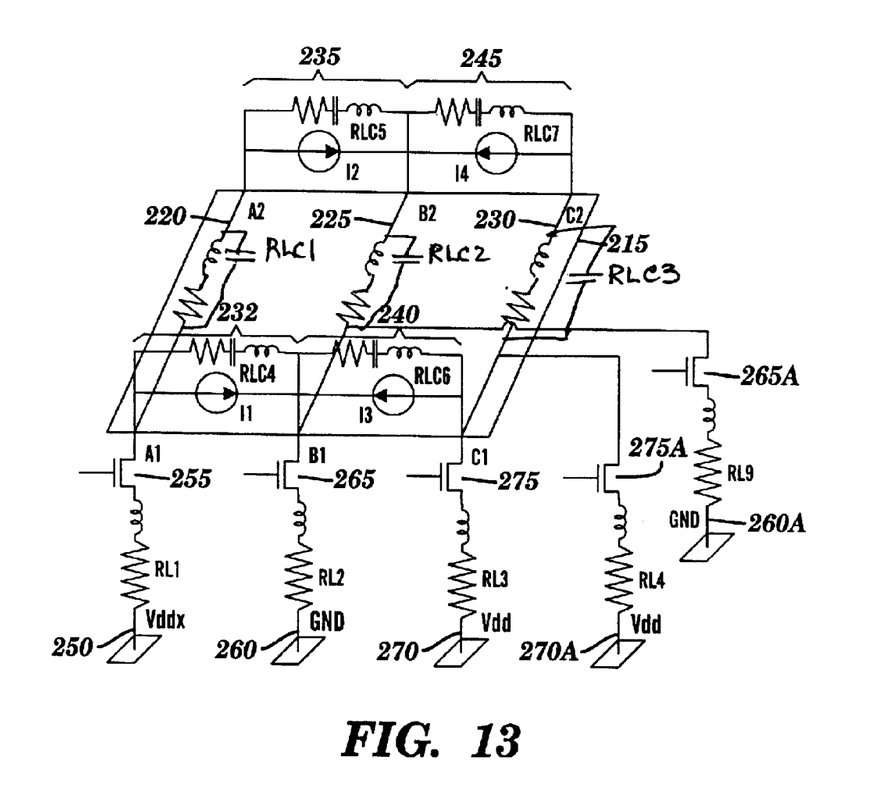
FIG. 13 is a diagram of an equivalent circuit model of a chip voltage island after assigning a programmable power pad to the chip voltage island according to the present invention.

If in step 335, the noise level is not acceptable then the method proceeds to step 345. In step 345, it is determined if a programmable power pin is available in chip voltage island 145. If a programmable power pin is available then in step 350 a programmable power pin is assigned and the method loops to step 280 of FIG. 8. A programmable power pin is an I/O signal pin that may be assigned to a power pin by inserting an I/O cell that connects the chip pad to the power bus connector. The package pin for that signal is also connected to the same voltage supply at the card level. The use of a programmable power pin will reduce noise if the constraint in power delivery to chip voltage island 145 resides between package voltage island pads 150A and power grid 215. Addition of a programmable power pin will reduce the inductance of the power net of the chip 105/wirebond package 110 combination. However, steps 280, 325, 330 and 335 must be repeated to determine if adding the programmable power pin was effective in reducing noise. A simulated circuit model of a chip voltage island after assigning a programmable power pad to the chip voltage island is illustrated in FIG. 13 and described below. If adding a programmable power pin reduces noise but not low enough the method loops to step 345.

If in step 345, there is no programmable power pin(s) available or if adding a programmable power pin(s) did not reduce the noise to an acceptable level then the method proceeds to optional step 355. If adding a programmable power pin does not reduce noise, then the constraint in power delivery to chip voltage island 145 resides between package voltage island pads 150A and the external power source. In optional step 355, added programmable power pins are removed and in step 360 another package voltage island pad 150A is assigned to package voltage island 155 and the method loops to step 285 of FIG. 8. Assignment of another package voltage island pad to a package voltage island is illustrated in FIG. 14 and described below. Of course, limits to the number of loops executed to reduce noise to an acceptable limit may be imposed.

FIG. 12 is a plot of voltage vs. time illustrating noise induced in a quiet wirebond wire by an active wirebond wire according to the present invention. In FIG. 12, as active line 365 switches low to high a negative voltage spike 370A, is induced in quiet line 375. A positive voltage spike 370B is induced in quiet line 375 when active line switches from high to low.

Figure 14A:
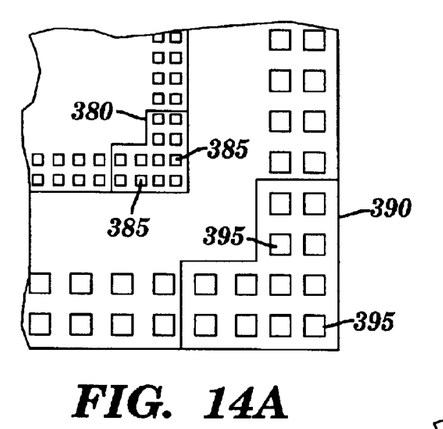
FIG. 14A is partial top view illustrating the chip pads initially assigned to a chip voltage island and package pads initially assigned to a package voltage island.

FIG. 13 is a diagram of an equivalent circuit model of chip voltage island 145 after assigning a programmable power pad to the chip voltage island according to the present invention. In FIG. 13, an additional GND pad 260A (modeled by a resistor and inductor RL9) and header device 265A have been connected to GND bus 225. This example assumes that the noise on GND bus 225 was unacceptable in step 335, while the noise on $V_{DDX}$ bus 220 was acceptable FIG. 14A is partial top view illustrating the chip pads initially assigned to a chip voltage island and package pads initially assigned to a package voltage island. In FIG. 14A, a voltage island pad region 380 contains (in this example) twelve chip voltage island pads 385 and a package voltage island 390 contains (in this example) twelve package voltage island pads 395.

Figure 14B:
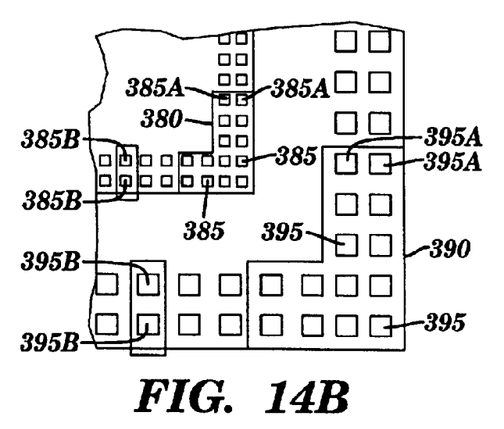
FIG. 14B is partial top view illustrating chip pads 385 initially assigned to chip voltage island 380, package pads 395 initially assigned to a package voltage island 390 and added chip voltage island pads 385A and package voltage island pads 395A.

FIG. 14B is partial top view illustrating chip pads 385 initially assigned to chip voltage island 380, package pads 395 initially assigned to a package voltage island 390 and added package voltage island pads 395A. In FIG. 14B, voltage island pad. region 380 contains (in this example) twelve chip voltage island pads 385 and two newly chip voltage island pads 385A and assigned package voltage island 390 contains (in this example) twelve initial package voltage island pads 395 plus two newly assigned package voltage island pads 395A. While new chip voltage island pads 385A are contiguous with chip voltage island pads 385 and new package voltage island pads 395A are contiguous with package voltage island pads 395 it is possible to assign chip voltage island pads and package voltage island pads that are not contiguous with the initial package voltage island pads. For example, chip voltage island pads 385B and package voltage island pads 395B are not contiguous with chip voltage island pads 385 and package voltage island pads 395 respectively.

FIG. 15 is a table illustrating a package design specification according to the present invention. A package design specification includes a list of chip pads IDs, a list of the corresponding package pad IDs, a list of corresponding functions for the chip pads, and other parameters such as wirebond wire length, loop height, etc.

Figure 16:
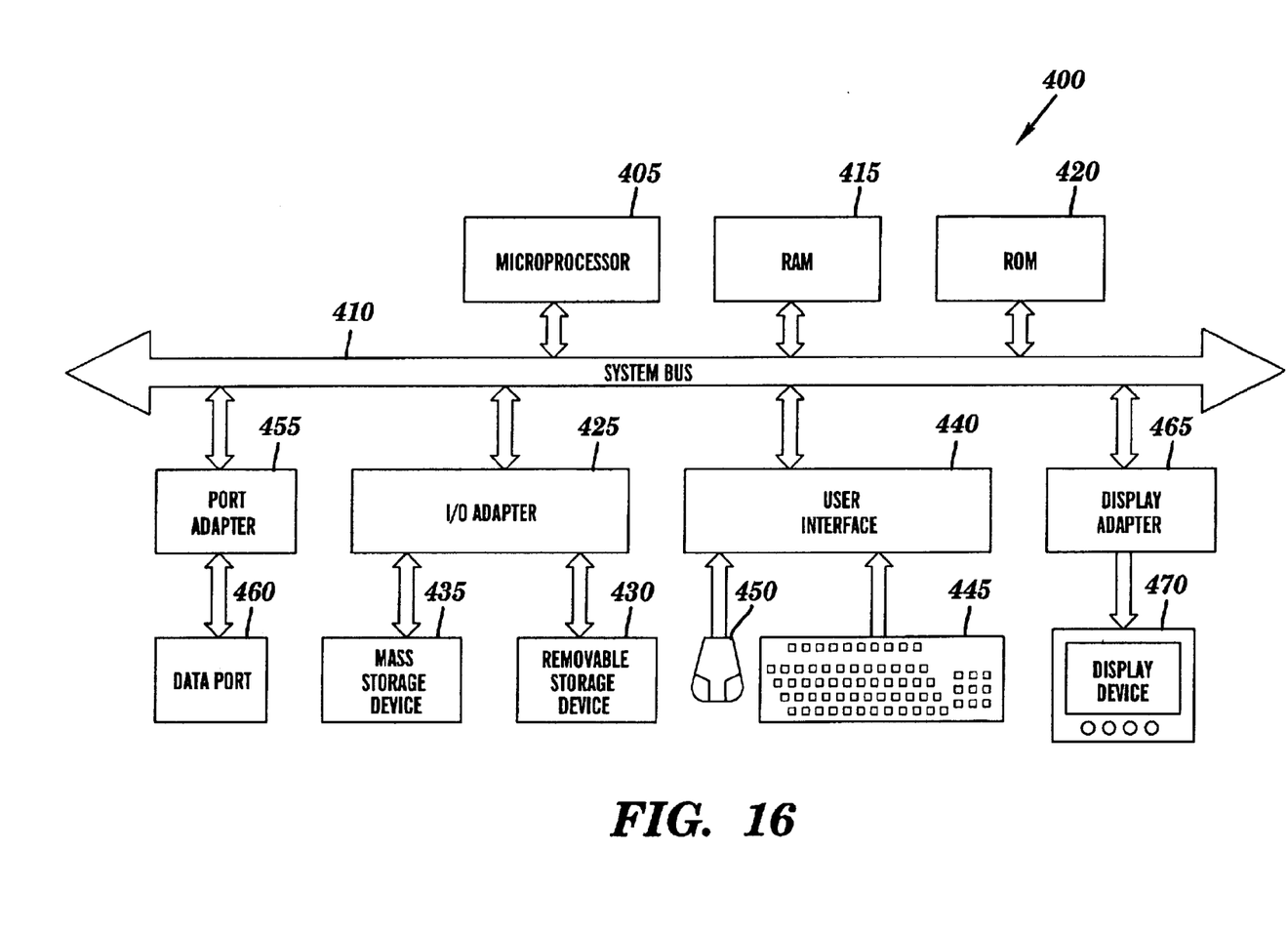
FIG. 16 is a schematic block diagram of a general-purpose computer for practicing the present invention.

Generally, the method described herein with respect to designing a voltage partitioned wirebond package is practiced with a general-purpose computer and the method may be coded as a set of instructions on removable or hard media for use by the general-purpose computer. FIG. 16 is a schematic block diagram of a general-purpose computer for practicing the present invention. In FIG. 16, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, the method described is applicable to other package types such as tape-automated bonding (TAB) packages wherein wirebond wires are replaced by conductive beams attached to bump chip pads (instead of flat chip pads) on the chip. Therefore, it is intended that the following claims cover all such modifications and changes as fall within the true spirit and scope of the invention.

What is claimed is:

1. A method of designing voltage partitions in a package for a chip, comprising:

determining the current requirements of a chip voltage island comprising a voltage island and power and signal chip pads;

computing the voltage drop across power buses in said chip voltage island;

assigning additional chip pads to said chip voltage island for use as power pads if the voltage drop is not acceptable;

defining a package voltage island, said package voltage island including power and signal package pads;

analyzing electrical attributes of a combination of said chip voltage island, said package voltage island and conductive interconnects connecting chip voltage island pads to package voltage island pads; and assigning additional chip pads to said chip voltage island and additional package pads to said package voltage island for use as power pads until said electrical attributes are acceptable.

2. The method of claim 1, further including defining a chip voltage island based on circuit requirements.

3. The method of claim 1, wherein said current requirements of said chip voltage island includes one or more current requirements selected from the group consisting of average current, peak current and current slew rate.

4. The method of claim 1 wherein said conductive interconnects are selected from the group consisting of wirebond wires and conductive beams.

5. The method of claim 1, wherein said electrical attributes include one or more attributes selected from the group consisting of noise, power supply impedance, power supply resonance, signal integrity and signal jitter.

6. The method of claim 1, wherein said page is selected from the group consisting of wirebond packages and tape-automated-bonding packages.

7. The method of claim 1, wherein said chip voltage island pads are contiguous.

8. The method of claim 1, wherein said package voltage island pads are contiguous.

9. The method of claim 1, further including assigning a programmable power pin to said voltage partition in response to an unacceptable electrical attribute.

10. A computer system comprising a processor, an address/data bus coupled to said processor, and a computer-readable memory unit coupled to communicate with said processor, said memory unit containing instructions that when executed implement a method for designing voltage partitions in a package for a chip, said method comprising the computer implemented steps of:

determining the current requirements of a chip voltage island comprising a voltage island and power and signal chip pads;

computing the voltage drop across power buses in said chip voltage island;

assigning additional chip pads to said chip voltage island for use as power pads if the voltage drop is not acceptable;

defining a package voltage island, said package voltage island including power and signal package pads;

analyzing electrical attributes of a combination of said chip voltage island, said package voltage island and conductive interconnects connecting chip voltage island pads to package voltage island pads; and assigning additional chip pads to said chip voltage island and additional package pads to said package voltage island for use as power pads until said electrical attributes are acceptable.

11. The computer system of claim 10, further including the step of defining a chip voltage island based on circuit requirements.

12. The computer system of claim 10, wherein said current requirements of said chip voltage island includes one or more current requirements selected from the group consisting of average current, peak current and current slew rate.

13. The computer system of claim 10 wherein said conductive interconnects are selected from the group consisting of wirebond wires and conductive beams.

14. The computer system of claim 10, wherein said electrical tributes include one or more attributes selected from the group consisting of noise, power supply impedance, power supply resonance, signal integrity and signal jitter.

15. The computer system of claim 10, wherein said package is selected from the group consisting of wirebond packages and tape-automated-bonding packages.

16. The computer system of claim 10, wherein said chip voltage island pads are contiguous.

17. The computer system of clam 10, wherein said package voltage island pads are contiguous.

18. The computer system of claim 10, further including the step of assigning a programmable power pin to said voltage partition in response to an unacceptable electrical attribute.

19. A program storage device readable by machine, tangibly embodying a program of instructions executable by the machine to perform method steps for designing voltage partitions in a package for a chip said method steps comprising:

determining the current requirement of a chip voltage island comprising a voltage island and power and signal chip pads;

computing the voltage drop across power buses in said chip voltage island;

assigning additional chip pads to said chip voltage island for use as power pads if the voltage drop is not acceptable;

defining a package voltage island, said package voltage island including power and signal package pads;

analyzing electrical attributes of a combination of said chip voltage island, said package voltage island and conductive interconnects connecting chip voltage island pads to package voltage island pads; and assigning additional chip pads to said chip voltage island and additional package pads to said package voltage island for use as power pads until said electrical attributes are acceptable.

20. The program storage device of claim 19, further including the step of defining a chip voltage island based on circuit requirements.

21. The program storage device of claim 19, wherein said current requirements of said chip voltage island includes one or more current requirements selected from the group consisting of average current, peak current and current slew rate.

22. The program storage device of claim 19 wherein said conductive interconnects are selected from the group consisting of wirebond wires and conductive beams.

23. The program storage device of claim 19, wherein said electrical attributes include one or more attributes selected from the group consisting of noise, power supply impedance, power supply resonance, signal integrity and signal jitter.

24. The program storage device of claim 19, wherein said package is selected from the group consisting of wirebond packages and tape-automated-bonding packages.

25. The program storage device of claim 19, wherein said chip voltage island pads are contiguous.

26. The program storage device of claim 19, wherein said package voltage island pads are contiguous.

27. The program storage device of claim 19, further including the step of assigning a programmable power pin to said voltage partition in response to an unacceptable electrical attribute.

* * * * *